Oct. 2, 1951  A. L. STONE  2,570,080
DEVICE FOR GRIPPING PIPES
Filed May 1, 1948  2 Sheets-Sheet 1
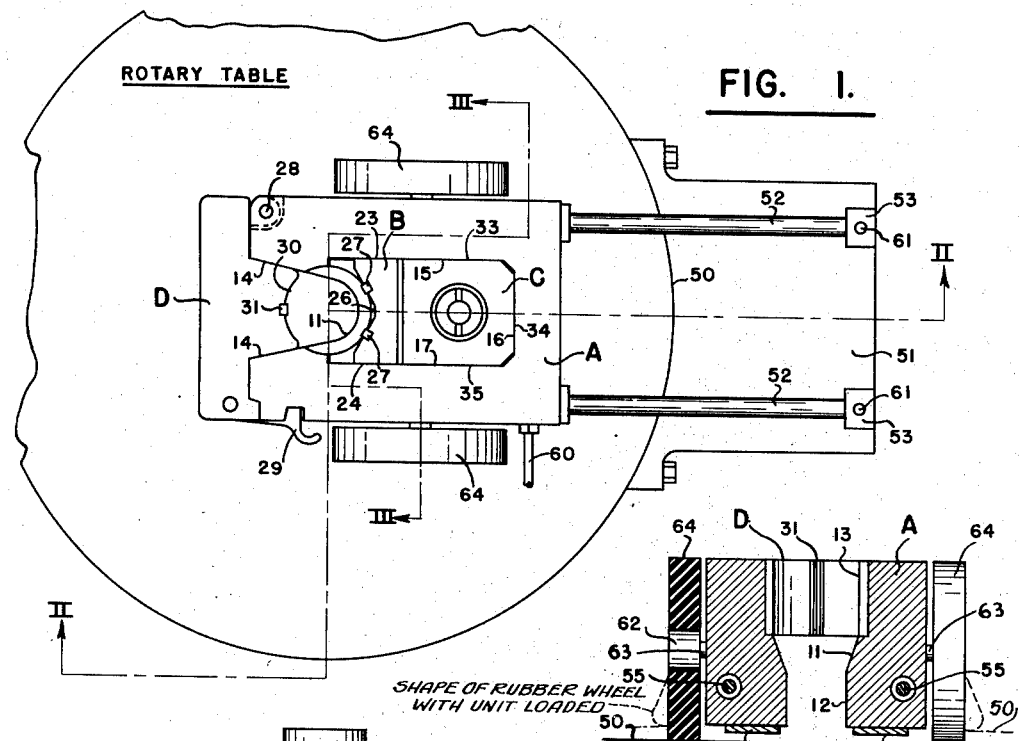
FIG. 1.
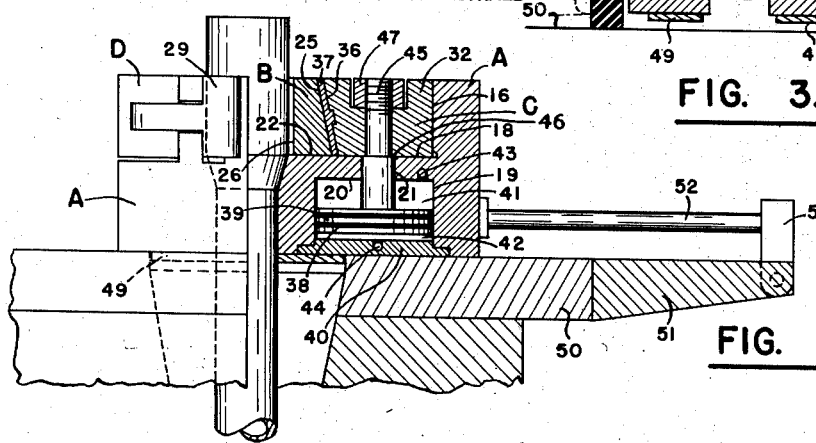
FIG. 3.
FIG. 2.
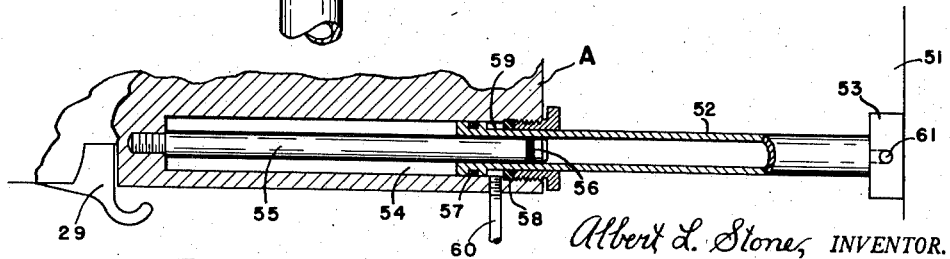
FIG. 4.
Albert L. Stone, INVENTOR.
BY
J. S. McKean
ATTORNEY.

Oct. 2, 1951 A. L. STONE 2,570,080
DEVICE FOR GRIPPING PIPES
Filed May 1, 1948 2 Sheets-Sheet 2

Albert L. Stone, INVENTOR.

BY

J. B. McLean
ATTORNEY.

Patented Oct. 2, 1951

2,570,080

UNITED STATES PATENT OFFICE 2,570,080

DEVICE FOR GRIPPING PIPES

Albert L. Stone, Redondo Beach, Calif., assignor, by mesne assignments, to Standard Oil Development Company, Elizabeth, N. J., a corporation of Delaware Application May 1, 1948, Serial No. 24,503

2 Claims. (Cl. 255—35)

The present invention is directed to a device adapted to support and grip a section of pipe.

In the drilling of boreholes using sections of pipe fastened together by screw joints for the drill stem, it is often necessary to break out and to make up joints, as when adding sections of pipe to the drill stem or when removing sections of pipe from the drill stem. In such operations it is necessary to provide means for supporting the section of pipe below the joint to be broken or made up and to provide some arrangement for applying rotative movement to the pipe on one side of the joint while holding the pipe on the other side of the joint.

It has heretofore been conventional to support the drill stem when raising or lowering it in the borehole by means of elevators arranged to fit around the section of pipe below a collar or coupling with the pipe supported from the elevator by means of the shoulder provided by the collar. With such an arrangement it has been necessary to provide gripping means for engaging with the substantially uniform portion of the pipe some distance below the joint to be broken.

The elevators described and claimed in my copending applications, Serial No. 727,712 entitled "Elevator for Pipe," filed February 10, 1947, now Patent No. 2,496,360, issued Feb. 7, 1950, and Serial No. 745,367 entitled "Combination Hook and Elevator," filed May 2, 1947, now abandoned, are arranged to grip sections of pipe by engaging with the threads thereof leaving the shoulder defined by the coupling unencumbered by the elevator and with such an arrangement it is convenient to support and grip the section of pipe immediately below the coupling when supporting the pipe in the hole when performing such operations as adding sections of pipe to and removing sections of pipe from the drill stem.

It is an object of the present invention to provide a device adapted to support a section of pipe by the coupling thereof and to grip the coupling to prevent rotation.

It is a further object of the present invention to provide a compact device for utilization with a conventional rotary drilling table which may be readily mounted on and removed from the table and when mounted on the table is capable of supporting and gripping a section of pipe to prevent downward movement and rotation thereof.

Other objects and advantages of the present invention will be seen from the following description taken in conjunction with the drawing in which:

Fig. 1 is a top plan view of an embodiment of the present invention mounted on a rotary table;

Fig. 2 is a side elevation partly in section taken along line II—II of the embodiment of Fig. 1 with parts in section and with a section of pipe gripped by the device;

Fig. 3 is a view taken along line III—III of Fig. 1;

Fig. 4 is a fragmentary view showing details of construction of portions shown in Figs. 1, 2, and 3;

Figure 5:
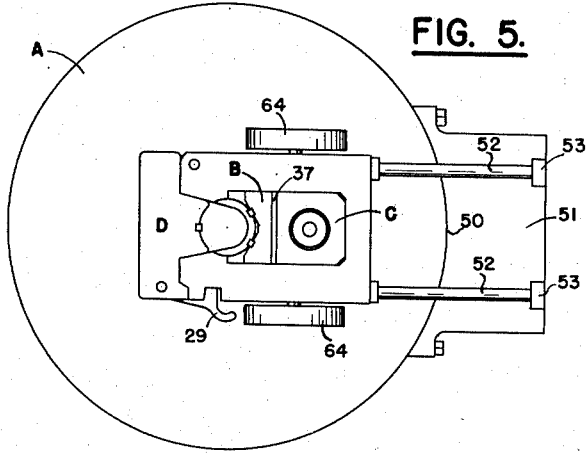
Fig. 5 is a plan view of the embodiment of Figs. 1, 2, and 3 showing the device in position on a conventional rotary table for gripping a section of pipe.

Turning now specifically to the drawing and first to the embodiment of Figs. 1, 2, and 3, a body A has movably mounted thereon a gripping member B with a power assembly C arranged to actuate the gripping member B. A door member D is hingedly mounted on body A.

Body member A has its end portion defining a slot with the base of the slot arcuate in form. The wall of body A defining said arcuate portion has an upper section 11, and lower section 12. Section 11 tapers downwardly and inwardly with the upper boundary thereof extending through an arc greater than 180° and a lower boundary thereof where it joins with section 12 defining an arc no greater than 180°. Arcuate section 11 is connected to arcuate section 13 which in turn extends to the top of the body. Sections 11, 12 and 13 connect with wall sections 14, which cooperate therewith to define the slotted portion of body A. The shape of the slot defined by sections 11 and 12 of body A is such that the tool joint of a pipe cannot enter the slot simply by moving the pipe horizontally. That is to say, the pipe must be in such a position that its tool joint is above the body A when placing the pipe in the body or when removing the pipe from the body. After the pipe has been moved horizontally so that its axis coincides with the axis of the arcuate portion of the slot, the pipe may be lowered so that it is seated in the body as shown in Fig. 2. The upper side of body A has a rectangular cavity which connects into the slot. The vertical sides of the rectangular cutout section are designated as 15, 16 and 17 and the floor thereof is designated as 18. On the bottom portion of body A immediately below the rectangular cavity is a circular cavity defined by wall portion 19 and top 20. A circular passage 21 connects the rectangular cavity with the circular cavity.

Gripping means B is a member having a bottom surface 22 fitting slidably on floor 18 of the rectangular cavity and vertical side members 23 and 24 which fit snugly, but slidably, with wall portions 15 and 17, respectively. The back wall 25 of member B is a plane making an oblique angle with bottom surface 22. The wall section 26 of member B is adjacent the section of pipe to be gripped and is generally in the shape of a jaw with die members 27 mounted thereon.

Door D mounted on body A is arranged to pivot on axle 28 which is parallel with the center line of arcuate sections 11, 12 and 13. Door D is provided with latch 29 adapted to engage releasably with body A. When a section of pipe is in the slot portion of body A adjacent die members 27 and door D is closed, the surface 30 of the door is adjacent the shoulder of the pipe with die member 31 mounted on the door arranged to cooperate with die members 27 for gripping the collar of the pipe. The latching means 29 is arranged to latch automatically when door D is swung to a closed position and is adapted to be released by an operator. For this reason door D and die member 31 are provided with sufficient clearance to allow convenient operation of latch 29 to release the door.

In order to grip the collar of the pipe to prevent rotation thereof when supported by the device the assembly C is provided. Assembly C is arranged to bias gripping member B toward the center of the pipe supported by the slot, the die members 27 thereof forcing the section of pipe against die 31 of door C.

Power assembly C includes member 32 having a generally rectangular shape with side portions 33, 34 and 35 fitting snugly, but slidingly, with corresponding sides 15, 16 and 17 of the rectangular cavity of body A. The other side 36 of member 32 is a plane oblique to floor 18 of the rectangular cavity and parallel to side 25 of gripping member B.

Members B and 32 cooperate to form a wedge assembly. In normal operation sides 34 and 16 contact slidably so that gripping member B moves along the longitudinal axis of body A upon vertical movement of member 32. A member 37 which has parallel sides is between surfaces 25 and 36 of members B and 32. Member 37 may be considered to be a spacing member inasmuch as members of different width may be used between the two surfaces 25 and 36 or member 37 may be removed entirely from the device. Whether surfaces 25 and 36 are separated by a member 37 or are in direct contact, the two members B and 32 will be designated as a wedge assembly inasmuch as gripping member B is moved parallel to the longitudinal axis of the body A upon movement of member 32 perpendicular to the longitudinal axis of body A.

Arranged in the circular cavity defined by the lower portion of body A is a piston 38 having sealing means 39 arranged to contact surface 19 to make a fluid tight seal. A plate 40 is secured to body A to form a cover for the cavity with that portion of the cavity between piston 38 and surface 20 designated as 41, and that portion of the cavity between piston 38 and plate 40 designated as 42. A port 43 is arranged to discharge into cavity 41 and a similar port 44 is arranged to discharge into cavity 42. A piston rod 45 is connected to piston 38 and extends upwardly through a cylindrical opening in member 32. The lower portion of piston rod 45 has a slightly greater diameter than the upper portion and defines shoulder 46 where the two portions join together, said shoulder being arranged to contact the lower portion of member 32 when the piston rod is moved upwardly. The upper portion of body 32 is provided with a counter bore to receive an annular member 47 which is secured to the upper end of the piston rod. Member 47 exerts the downward bias on member 32 when piston 38 moves downwardly.

When gripping member B is to be biased toward the center line of the arcuate portions 11 and 12 of the slot, fluid pressure may be exerted through port 43, by suitable means not shown in the drawing, while pressure is released from cavity 42 through port 44. The force is transmitted to cavity 41 and exerted on piston 38 which in turn transmits the force through piston rod 45, member 47 and member 32 and causes a force to be transmitted from wedge surface 36 to wedge surface 25. When it is desired to release the bias exerted by die members 27 against a section of pipe held in the gripping means this may be accomplished by releasing pressure from cavity 41 through port 43 which in turn allows piston 38 to move upwardly. If desired a positive means may be employed for releasing the bias by exerting a pressure through inlet 44 while releasing pressure through inlet 43; this causes shoulder 46 to move member 32 upwardly and allows movement of gripping member B away from the center line of the opening defined by arcuate surfaces 11 and 12. However, if a force is exerted against member B mechanically, such a force will usually be sufficient to move member B away from the center line of the arcuate opening without the application of a power fluid against piston 38.

The gripping means of Figs. 1, 2 and 3, is particularly adapted for suspending and gripping sections of pipe used as a drill stem in a rotary drilling rig. It is conventional for the rotary tables employed in such drilling rigs to have an opening of generally circular shape with a square opening of slightly larger dimensions than the circular opening immediately above the circular opening. It is convenient to provide the device of the present invention with a square downwardly extending shoulder adapted to fit in the square shaped opening of a conventional rotary table. Such a downwardly extending shoulder is designated as 49 in the drawing. In Fig. 2 shoulder 49 is shown as extending into a similar opening of rotary table 50.

Figure 6:
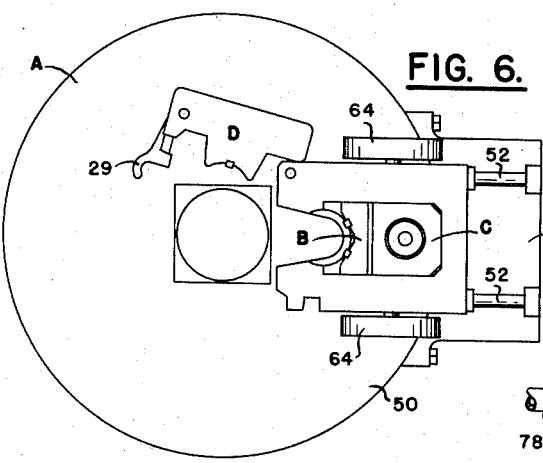
Fig. 6 is a view of the device of Figs. 1 to 4 showing parts in the position assumed when the device is moved away from the opening of the rotary table.

In drilling operations it is often desirable to place the means for suspending pipe in position on the rotary during pipe handling operations and to remove the suspending means from the rotary at other times. The device of the present invention is provided with a convenient means for positioning it on and removing it from the rotary when desired. In the embodiment of Figs. 1 to 3 guides and power means are connected to a suitable foundation member 51 adjacent the rotary table 50 and arranged to cooperate with body A for guiding and moving it to the center of the rotary as shown in Fig. 4 and to one side of the rotary as shown in Fig. 6. Tubular members 52 have ends 53 secured to foundation 51. The tubular members are mounted parallel and arranged to fit slidably in parallel passages 54 defined by body A. A rod member 55 is arranged in lock passage 54 concentric with tubular member 52 and is secured to body A. The free end of each rod 55 is provided with a seal 56. A seal 57 is mounted on the exterior of the free end of each tubular member 52 and a packing 58 is mounted on body A adjacent each tubular member 52 and is spaced from seal 57 to define a cavity 59. A port 60 passes through the wall of body A in communication with cavity 59. A port 61 passes through member 53 and fluidly connects with the interior of tubular member 52.

Movement of body A away from anchoring members 53 is produced by supplying fluid under pressure from a suitable source of supply, not shown in the drawing, through port 61 and into tubular member 52 where pressure is exerted by the fluid against the ends of rods 55 which serve as rams and force body A away from anchoring members 53. Movement of body A toward anchoring members 53 is provided by releasing fluid from the interior of tubular members 52 and exerting fluid pressure from a source of fluid pressure, not shown in the drawing, through port 60 to cavity 59 where the pressure is exerted against seals 57 and 58. Inasmuch as seal 57 is mounted on tubular member 52 which is anchored against movement, the fluid pressure causes movement of body member A toward anchoring members 53. In the arrangement shown in the embodiment of Figs. 1 to 5 the area defined by the end of rod members 55 is the same as the area of seal 57 exposed to cavity 59 so that the same volume of fluid serves to move body A either toward or away from anchoring members 53.

In order to reduce the effort required to move body member A it may be provided with wheel members 62 mounted on body A by axles 63. Wheels 62 are arranged to support the load of the pipe gripping means but are deflectable under greater loads. In the drawing wheels 62 are shown as provided with rubber tires 64 of a relatively large area so that they are deflected under the load of a section of pipe gripped in the assembly. When the assembly is moved to the center of the rotary as shown in Fig. 1 and is engaged with a section of pipe, the wheels are deflected under the load, and the downwardly extending shoulder 49 fits in the corresponding square opening in the rotary table. When the shoulder 49 fits into the square opening of the rotary as described, the device is held firmly so that in breaking out or making up joints of pipe the section of the pipe below the joint to be broken or made up moves only upon movement of the rotary. If a tong is used for breaking out or making up joints the rotary remains stationary and serves as a back up means. If desired the tongs may be used to hold back up above the joint to be broken and the rotary rotated to break the joint.

Figure 9:
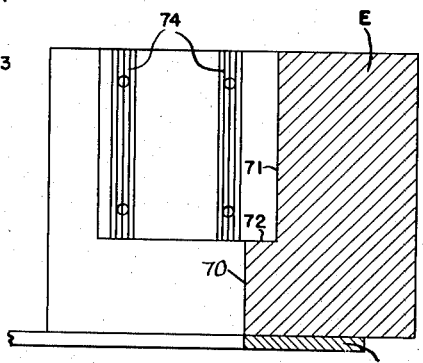
Fig. 9 is a view taken along line IX—IX of Fig. 7.
Figure 8:
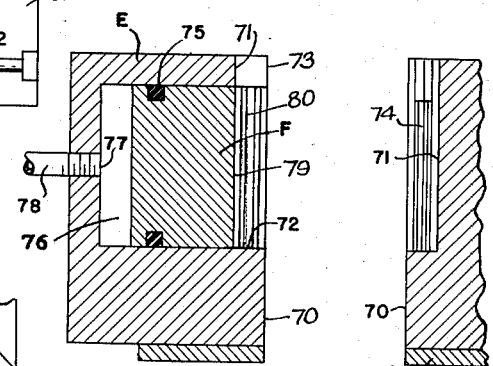
Fig. 8 is a section taken along line VIII—VIII of Fig. 7.
Figure 7:
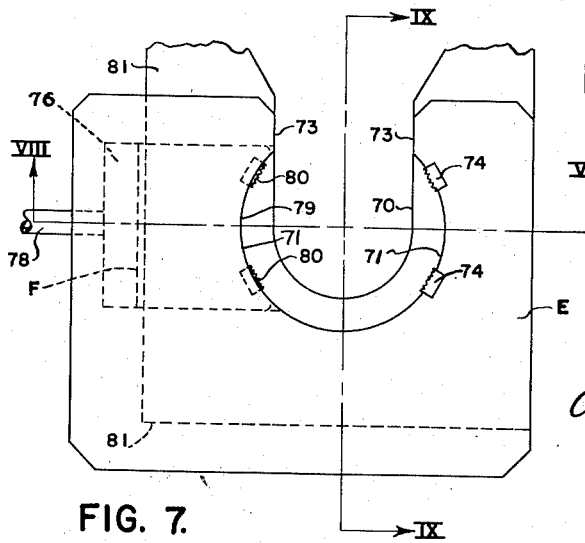
Fig. 7 is a plan view of another embodiment of the present invention.

Another embodiment of the present invention is shown in Figs. 7, 8 and 9. In this embodiment the body of the device is designated as E and the gripping member as F.

Body E defines a slotted portion with the base thereof arcuate and having a lower portion 70 defining an arc no greater than 180° and an upper portion 71 defining an arc greater than 180° with the two arcuate portions connected together by surface 72 which defines an upwardly facing shoulder. Surfaces 70, 71, and 72 are connected with wall portions 73 to complete the slot.

The embodiment of Figs. 7, 8, and 9 is arranged to support and grip a section of pipe having a square shouldered coupling or tool joint at the end thereof. The shoulder of the coupling or tool joint is adapted to rest on shoulder 72 of body E to support the section of pipe. Die members 74 are mounted on body E above shoulder 72 and project inwardly beyond arcuate surface 71 for gripping the joint of the pipe.

The body E of Figs. 7, 8 and 9 is like body A of the previously described embodiment in that a section of pipe can be placed within the slot defined by the body only when the tool joint is above the body. After the axis of the tool joint coincides with the center of a radius of the arcuate portions 70 and 71 the pipe may then be lowered in position so its shoulder rests on the ledge 72 of the body.

Body E defines a cylindrical passage in which gripping member F is arranged for slidable movement. Member F is provided with a sealing ring 75 which prevents loss of fluid from cavity 76. Entrance of fluid to cavity 76 is provided by port 77 which is connected through conduit 78 to a suitable source of fluid pressure, not shown in the drawing. The wall portion 79 of member F adjacent the slot of body E is arcuate in shape having the same radius as wall portion 71 of body E. Die members 80 are mounted on member F with edges projecting slightly beyond surface 79.

In the embodiment of Figs. 7, 8, and 9 the section of pipe to be gripped is passed through the slot of body E and the shoulder of the tool joint allowed to rest on shoulder 72 to support the section. The pipe is then gripped to prevent rotative movement thereof by forcing fluid through conduit 78, port 77 and into cavity 76 where the fluid pressure biases gripping member F toward the center line of the arcuate portion of the slot whereby die members 80 are forced against the coupling portion of the pipe section. This movement of gripping member F forces the coupling portion of the pipe section against die members 74 so that the die members 74 and 80 cooperate to prevent rotative movement of the section of pipe. Body E defines a downwardly extending shoulder 81 which corresponds to shoulder 49 of the embodiment of Figs. 1 to 6, inclusive, and adapted to fit into the corresponding square shaped opening of a conventional rotary table to prevent relative movement of body E with respect to the rotary table. In order to simplify the showing of the embodiment of Figs. 7, 8, and 9, the wheels 62 and guide members 52 shown in the embodiment of Figs. 1 to 6 have been omitted. It will be understood that any desirable positioning and guide means may be applied to either of the embodiments shown.

The device of the present invention will be seen to embody a member of advantageous features. It provides a compact simple arrangement which is conveniently moved from one position to another and which is supporting and gripping the coupling of a section of pipe to prevent downward and rotative movement thereof. It is a feature of the present invention that if the tool joint or coupling gripped by the device is out of round, any relative angular movement between the pipe and the gripping device causes a considerably greater gripping force to be exerted than can be produced solely by the pressure of the hydraulic fluid acting against the piston. In other words, an out of round tool joint is shaped like a cam and the device of the present invention takes advantage of this cam shape to increase its holding force.

While I have shown preferred embodiments of the present invention, it will be apparent to a worker skilled in the art that various changes may be made in the sizes, shapes and proportions of the device of the present invention without departing from the scope thereof.

Having fully described and illustrated preferred embodiments of the present invention, what I desire to claim as new and useful and to secure by Letters Patent is:

1. A device for supporting and gripping a section of pipe having an outwardly extending shoulder of greater diameter than the body of the pipe comprising, in combination, a body member defining a slotted opening with the base of the opening arcuate in shape and the lower portion of the arcuate surface defining an arc no greater than 180° and having a radius slightly greater than that of the body portion of the pipe and less than that of the shoulder portion for fitting slidingly but snugly with said body portion and the upper portion defining an arcuate surface greater than 180° and with a radius slightly greater than that of said shoulder for receiving the shoulder slidingly but snugly, a first die member carried by the body for gripping a section of pipe supported on the base of the body, a releasable gripping element slidably mounted on the body member adapted for movement toward and away from the center line of the arcuate surface and said first die member and carrying additional die members on a surface adjacent the opening and having a wedge surface on a side opposite said die members, a wedge member slidably mounted on the body member adapted to move perpendicular to the path of the gripping element with the wedge surface slidably engaged with the wedge surface of the gripping element, a power transmitting means mechanically connected to the wedge member, wheels mounted on the body member having tires which distort under the load of a section of pipe supported by the body member to allow the body member to rest on a support, an anchoring means, and power means including a piston and cylinder assembly with one element secured to the body member and the other element secured to the anchoring means for moving the body in a straight line toward and away from said anchoring means.

2. A device for supporting and gripping a vertical section of pipe extending through the central opening of a rotary table, the upper portion of the opening of the rotary table having a non-circular boundary and the upper end of the pipe having an outwardly extending shoulder of greater diameter than the body of the pipe, the device comprising, in combination, a body member defining a slotted opening with the base of the opening arcuate in shape and the lower portion of the arcuate surface defining an arc of 180° and having a radius slightly greater than that of the body portion of the pipe and less than that of the shoulder portion for fitting slidingly but snugly with said body portion and the other portion defining an arcuate surface greater than 180° and having a radius slightly greater than that of said shoulder for receiving the shoulder slidingly but snugly, the lower surface of the body member having a downwardly extending non-circular portion of the same configuration as the upper non-circular boundary of the rotary table with which the device is to be used and fitting slidingly and snugly therein, a first die member carried by the body for gripping a section of pipe supported on the base of the body, a releasable gripping element slidably mounted on the body member adapted for movement toward and away from the center line of the arcuate surface and toward and away from said first die member and carrying additional die members on a surface adjacent the opening, wheels mounted on the body member having tires which distort under the load of a section of pipe supported by the body member to allow said downwardly extending portion of the body member to fit into said central opening of the rotary table with the body supported on the rotary table, an anchor means mounted adjacent the rotary table, and a power means consisting of a cylinder and piston having one member secured to the anchor means and the other member secured to the body arranged for moving the body member in a straight line between the center of the rotary table and said anchor means.

ALBERT L. STONE.

REFERENCES CITED

The following references are of record in the file of this patent:

UNITED STATES PATENTS

| Number | Name | Date |
|---|---|---|
| 136,812 | Bullock | Mar. 18, 1873 |
| 1,060,477 | Meyers | Apr. 29, 1913 |
| 1,113,659 | Lebus | Oct. 13, 1914 |
| 1,342,870 | Robichaux et al. | June 8, 1920 |
| 2,000,221 | Dawson | May 7, 1935 |
| 2,453,369 | Grable et al. | Nov. 9, 1948 |